(12) United States Patent
Gilbertson

(10) Patent No.: US 12,000,069 B2
(45) Date of Patent: Jun. 4, 2024

(54) THREE-DIMENSIONAL WOVEN SUPPORT BEAM AND METHOD OF MAKING THEREOF

(71) Applicant: Albany Engineered Composites, Inc., Rochester, NH (US)

(72) Inventor: Brock Gilbertson, Saco, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 261 days.

(21) Appl. No.: 16/878,817

(22) Filed: May 20, 2020

(65) Prior Publication Data

US 2020/0370212 A1 Nov. 26, 2020

Related U.S. Application Data

(63) Continuation of application No. PCT/US2020/033581, filed on May 19, 2020.

(60) Provisional application No. 62/851,329, filed on May 22, 2019.

(51) Int. Cl.
*D03D 25/00* (2006.01)
*D03D 1/00* (2006.01)
*D03D 3/00* (2006.01)

(52) U.S. Cl.
CPC ............ *D03D 25/005* (2013.01); *D03D 1/00* (2013.01); *D03D 3/00* (2013.01); *D10B 2505/02* (2013.01)

(58) Field of Classification Search
None
See application file for complete search history.

(56) References Cited

U.S. PATENT DOCUMENTS

| 4,922,968 A | 5/1990 | Böttger et al. |
| 6,283,168 B1 | 9/2001 | Gu et al. |
| 2013/0099062 A1 | 4/2013 | Seack et al. |

FOREIGN PATENT DOCUMENTS

| JP | S 62-78235 A | 4/1987 |
| JP | 2011-506784 A | 3/2011 |
| RU | 2503757 C2 | 1/2014 |
| RU | 2635281 C2 | 11/2017 |
| WO | WO 2009/076065 A2 | 6/2009 |

OTHER PUBLICATIONS

Machine translation of JPS6278235 (Year: 1987).*
International Search Report and Written Opinion, prepared by the European Patent Office, acting as the International Searching Authority, for priority application PCT/US2020/033581 dated Jul. 23, 2020.

* cited by examiner

*Primary Examiner* — Shawn Mckinnon
(74) *Attorney, Agent, or Firm* — McCarter & English, LLP

(57) ABSTRACT

Disclosed is a cruciform-shaped reinforcing structure with at least two arms of intersecting C-Beams having continuous warp fiber reinforcement across the length of each arm.

31 Claims, 15 Drawing Sheets

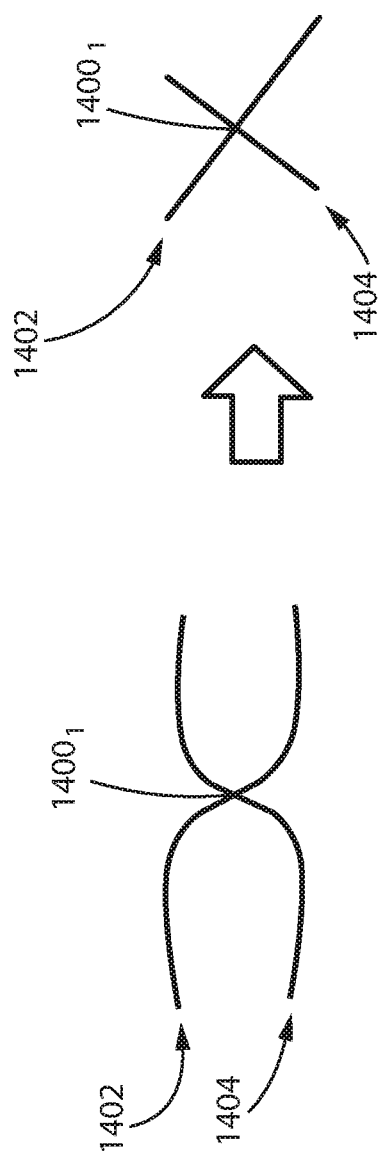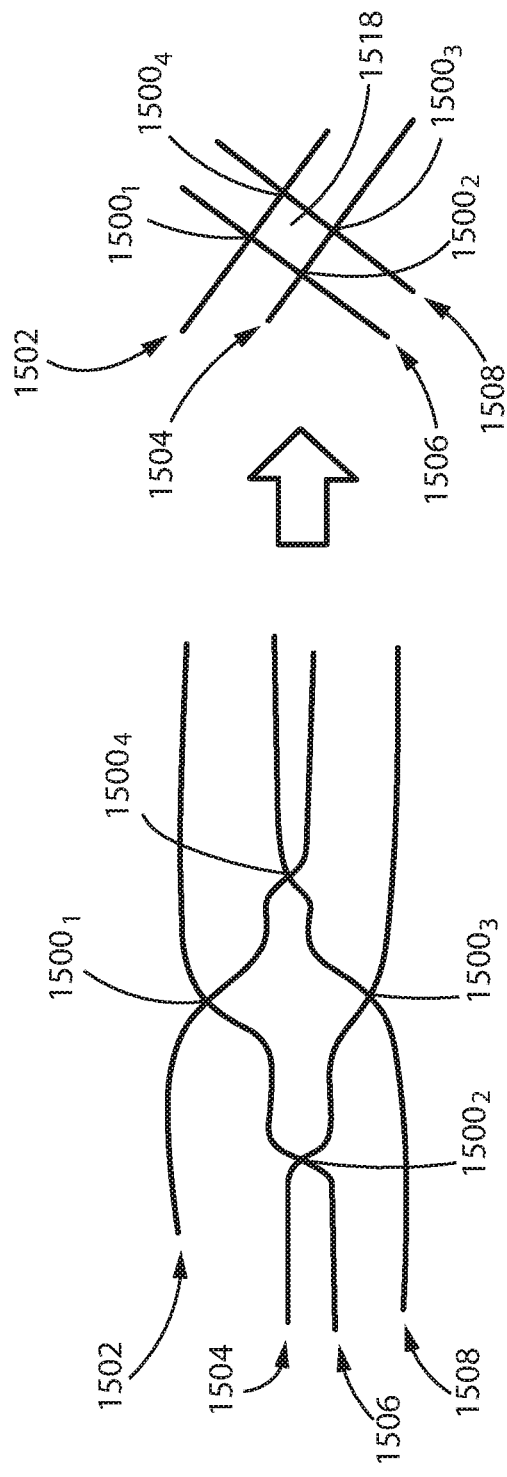
FIG. 14
FIG. 15

THREE-DIMENSIONAL WOVEN SUPPORT BEAM AND METHOD OF MAKING THEREOF

BACKGROUND

1. Field of the Disclosure

The disclosure relates to a three-dimensional woven preform having the form of a support beam. In particular, the disclosure includes intersecting support beams having continuous warp reinforcement along both lengths of the beams and a method of making thereof.

2. Related Art

The use of reinforced composite materials to produce structural components is now widespread, particularly in applications where their desirable characteristics are sought of being light in weight, strong, tough, thermally resistant, self-supporting, and adaptable to being formed and shaped. Such components are used, for example, in aeronautical, aerospace, satellite, recreational (as in racing boats and autos), and other applications.

Typically such structural components may be used in reinforcement components. The structural components can include reinforced composites having reinforcement preforms in the shape of I-Beams, H-Beams, or C-Beams, for example, made from reinforcement materials embedded in matrix materials. The support beam may be made from materials such as glass, carbon, ceramic, aramid, polyethylene, and/or other materials, which exhibit desired physical, thermal, chemical, and/or other properties, chief among which is great strength against stress failure. Through the use of such materials, which ultimately become a constituent element of the completed reinforcement component, the desired characteristics of the materials, such as very high strength, are imparted to the completed reinforcement component. The constituent reinforcement preforms typically may be woven, knitted, nonwoven or otherwise oriented into desired configurations and shapes. Usually particular attention is paid to ensure the optimum utilization of the properties for which the constituent reinforcing materials have been selected. Usually such reinforcement preforms are combined with matrix material to form desired finished reinforcement structural components or to produce working stock for the ultimate production of finished reinforcement components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical, and/or other properties. The materials chosen for use as the matrix may or may not be the same as that of the reinforcement preform and may or may not have comparable physical, chemical, thermal, or other properties. Typically, however, they will not be of the same materials or have comparable physical, chemical, thermal, or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. After being cured, the then solidified mass of the matrix material normally is very strongly adhered to the reinforcing material (e.g., the reinforcement preform). As a result, stress on the finished component, particularly via its matrix material acting as an adhesive between fibers or other constituent material, may be effectively transferred to and borne by the constituent material of the reinforcing preform.

A typical combination of preform reinforcement support beams is made by the preforms at an angle (typically a right-angle) with respect to each other. Usual purposes for such angular arrangements of joined reinforcement preforms are to create a desired shape to form a reinforcement preform to strengthen the resulting composite structure that it produces against deflection or failure upon being exposed to exterior forces, such as pressure or tension. In any case, a related consideration is to make each juncture between the reinforcement support beams as strong as possible. Given the often desired very high strength of the reinforcement preform constituents, weakness of the juncture becomes, effectively, a "weak link" in a structural "chain".

The support beams are attached at the juncture where they intersect. Most attachment schemes center on those acceptable for metals, e.g., using fasteners such as rivets, bolts, clips and the like. In particular, support beams in the shape of C-Beams intersecting one another have little area for attachment where they intersect. The standard construction method for beams in general includes one continuous primary beam to which the ends of secondary beams are attached. An improvement on this design incorporates continuous fiber across the intersection in the web of both the primary and secondary beams. However, in the case of C-Beam preforms, there are cuts in the flanges in at least one direction at the intersecting portion. The cut flanges could form a small lap shear joint with the continuous flange (See FIG. 1), but there is a limited overlapping area available in the intersecting portion requiring reinforcement with brackets, fasteners, and/or an additional separate piece that acts as a sill across the joint.

SUMMARY

Disclosed is a woven preform and method of forming thereof, including a first fabric woven over a second fabric in a first portion of the woven preform. Warp fibers of the first fabric are interwoven with warp fibers of the second fabric at a crossover portion of the woven preform such that after the crossover portion the first fabric is woven under the second fabric in a second portion of the woven preform. The warp fibers in the first and second fabrics are continuous across the crossover portion. The first and second fabrics can be single layer fabrics or multilayer fabrics.

In one embodiment, the warp fibers on edges of the first fabric and the warp fibers on edges of the second fabric are floating in the crossover portion.

In another embodiment, the first fabric can be rotated about the crossover portion to form an angle with respect to the second fabric. The angle formed can be 90 degrees or any desired angle depending on a final structural component configuration.

In yet another embodiment, the first and second fabrics are folded into a C-Beam. A composite structure may be formed by impregnating the preform with a matrix material.

Additionally disclosed is a woven preform and method of making thereof that includes weaving at least three woven fabrics including warp fibers interwoven with weft fibers, each woven fabric having a first fabric woven over a second fabric in a first portion of the woven preform. Each of the at least three fabrics is interwoven with at least two remaining woven fabrics at a respective crossover portion, such that there are at least two crossover portions in each woven fabric. After each crossover portion of the at least three woven fabrics, an intersecting fabric woven over another fabric is woven under the another woven fabric. The warp fibers in the intersecting fabrics are continuous across each crossover portion. Each of the at least three fabrics can be a single layer fabric or multilayer fabric.

In one embodiment, the warp fibers on edges of the at least three fabrics are floating in each crossover portion. The at least three fabrics can be rotated about the crossover portions so that the at least three fabrics form an angle with at least one other of the at least three fabrics.

In another embodiment, the at least three fabrics may be folded into a C-Beam.

In another embodiment, there are four fabrics, each fabric intersecting with exactly two other fabrics and four fabrics may be folded into a C-Beam.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings:

FIG. 14 illustrates a cross-sectional view of an as-woven preform having a single crossover portion.

FIG. 15 illustrates a cross-sectional view of an as-woven preform having four crossover portions.

DETAILED DESCRIPTION

Figure 1:
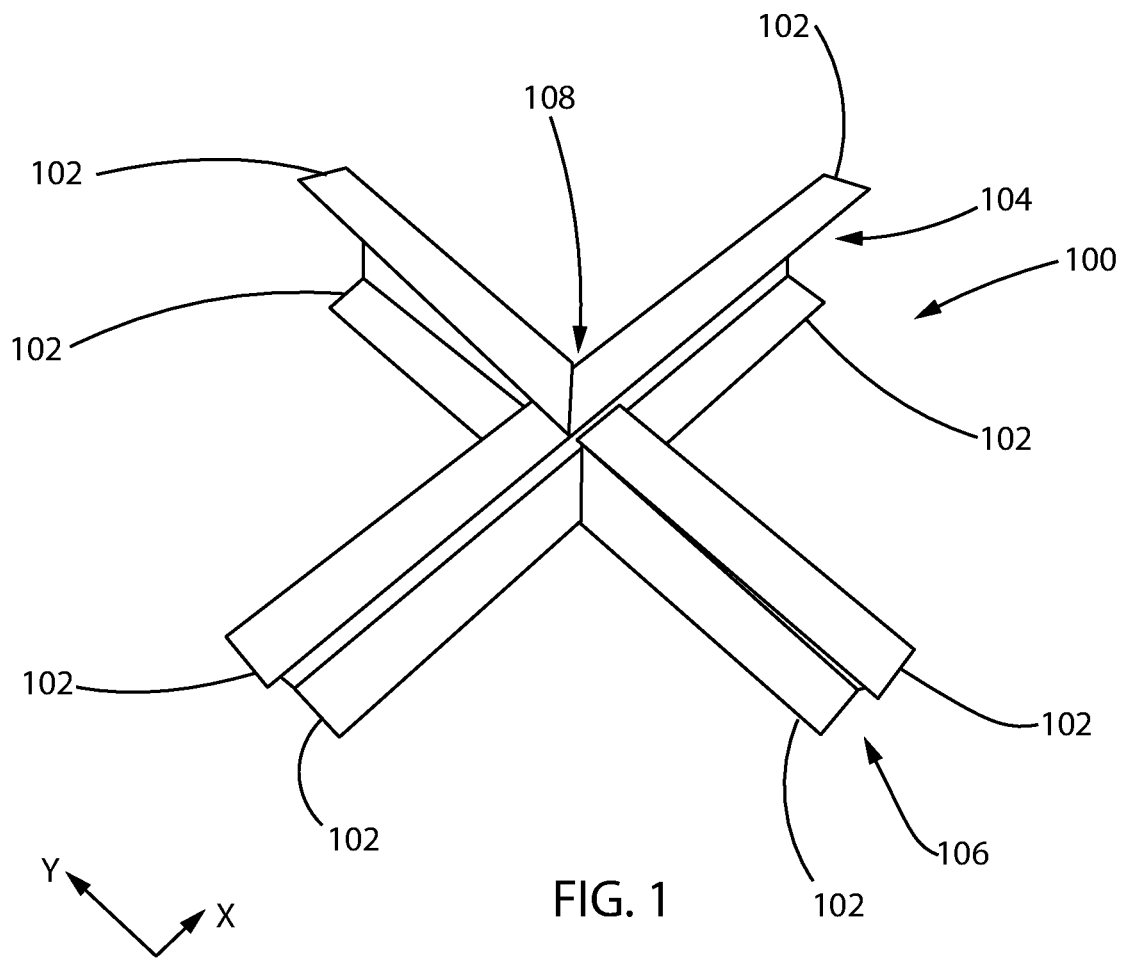
FIG. 1 illustrates a paper model of an as-formed cruciform with flanges.

The terms "comprising" and "comprises" in this disclosure mean "including" and "includes" or have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

The terms "threads", "fibers", "tows", and "yarns" are used interchangeably in the following description. "Threads", "fibers", "tows", and "yarns" as used herein includes monofilaments, multifilament yarns, twisted yarns, multifilament tows, textured yarns, braided tows, coated yarns, bicomponent yarns, as well as yarns made from stretch broken fibers of any materials known to those ordinarily skilled in the art. Yarns can be made of carbon, nylon, rayon, fiberglass, cotton, ceramic, aramid, polyester, metal, polyethylene glass, and/or other materials that exhibit desired physical, thermal, chemical, or other properties.

As used herein, "fabric" means warp fibers interwoven with weft fibers and a fabric can be either a single layer fabric or a multilayer fabric. The term "multilayer fabric" is used herein for convenience and includes single layer fabrics as well.

The term "folded" is broadly used herein to mean "forming", which includes unfolding, bending, and other such terms for manipulating the shape of a woven fabric. The terms "C-flange" and "C-Beam" are used interchangeably to refer to a structure having a C-shaped cross-section.

Similarly, the terms "H-Beam", "I-Beam", "T-Beam", "L-Beam", and "π-Beam" (Pi-Beam) are used to refer to structures having an H-, I-, T-, L-, or π-shaped (Pi-shaped) cross-section, respectively. However, this listing of cross-sectional shapes is not to be considered exhaustive. That is, all cross-sectional shapes are contemplated. The term "support beam" is used to include a beam having any cross-sectional shape.

In the following description, it is understood that such terms as "front", "back", "left", "right", "transverse", "longitudinal", "above", "below", "over", "under" and the like are words of relational convenience and are not to be construed as limiting terms.

For a better understanding of the invention, its advantages, and objects attained by its uses, reference is made to the accompanying descriptive matter in which non-limiting embodiments of the invention are illustrated in the accompanying drawings and in which corresponding components are identified by the same reference numerals.

The disclosure is directed to structural components with reinforcing preforms in the shape of a support beam. In one embodiment, disclosed is a three-dimensional (3D) woven cruciform preform having arms with a C-shaped cross-section (C-Beams) and fiber continuity across the length of the arms or fiber continuity over at least the crossover portion where the C-Beam arms of the cruciform intersect. Accordingly, the disclosure provides for a woven C-Beam support preform that avoids the need to cut the fibers in the C-beam arms or to use fasteners in order to attach the arms where they intersect.

FIG. 1 illustrates a model of a desired final shape of a 3D preform cruciform 100 having C-Beams 104, 106. As discussed below, the C-Beams are woven to have continuous warps along the intersecting flanges 102 of the C-Beams. This arrangement provides a cruciform with C-Beams or arms having continuous fiber in both directions X, Y of the cruciform. Where the X-direction is the direction of the warp fibers in a first arm and the Y-direction is the direction of the warp fibers in a second arm. That is, the flanges 102 of the C-beams have continuous warp tows across the length of the cruciform and, in particular, across crossover portion 108, which is the location where the C-Beams of the cruciform intersect.

The flanges of the C-Beam can provide an increase to the bending stiffness of the resultant cruciform reinforcing preform over C-Beam cruciform without fiber continuity across the crossover portion. The present disclosure provides for simultaneously achieving fabric continuity of fibers in both the X and Y direction of the cruciform. The simultaneous continuity is prevented in prior-art C-Beam cruciforms because the desired as-formed crossover location is different than the as-woven crossover location. That is, the weft fibers of the flanges prohibit the necessary sliding of the warp fibers in the crossover location to enable forming of the C-Beam flanges. FIG. 2C illustrates the change in position of this crossover location.

Figure 2:
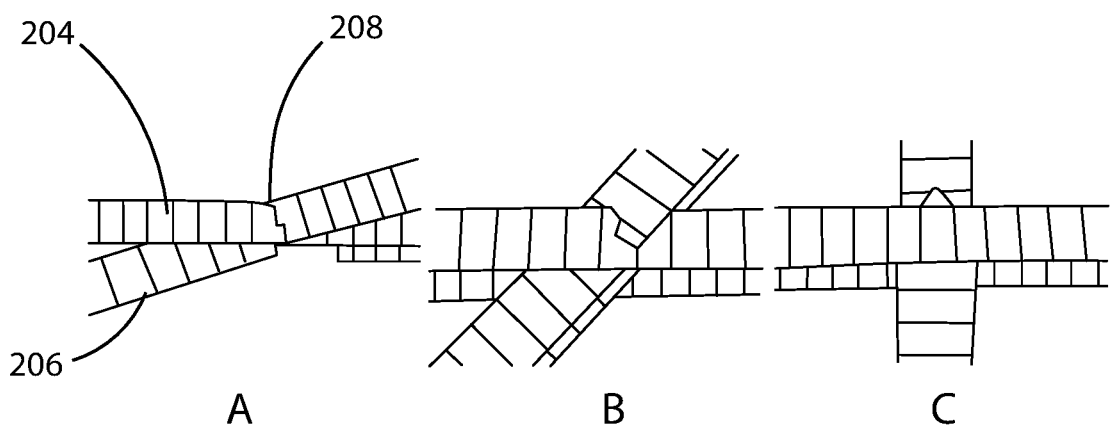
FIG. 2 illustrates a series of images illustrating movement of a line of intersection of weft fibers during forming a cruciform using a paper model.

FIG. 2 illustrates forming a C-Beam cruciform structure (from a top view) by rotating the arms (not visible) using a paper model for illustration. The added flanges (204, 206, and as in FIG. 2) that form a C-Beam cruciform structure increases the stiffness over an un-flanged cruciform (that is, without flanges 102) when a force or load is applied along the line formed by the intersecting arms 204, 206. However, cutting the warp fibers in the flanges to facilitate intersection of the cruciform arms results in a discontinuity of fibers in one of the flange directions. The discontinuity of the warp fibers creates a weak spot that can degrade the performance of a structure to the limit of what a subsequently applied resin bond can transfer across the crossover portion.

Maintaining continuous fiber throughout the flanges in both directions of a C-Beam cruciform can increase the tensile and compressive stiffness along the length of each arm of the resultant preform. The present invention enables warp fiber continuity simultaneously along each of the flanges of the arms of a C-Beam cruciform.

In an embodiment, at least some of the warp fibers float—that is, are not interwoven with weft fibers—in the crossover portion of the flanges throughout the range of motion of the arms. That is, the warp fibers in a flange of a first arm of the cruciform are free to slide against the warp fibers of a second arm of the cruciform in the crossover portion. This feature can enable the flat woven arms of a C-Beam to be rotated about the crossover portion into the as-formed geometry of the arms.

Figure 3:
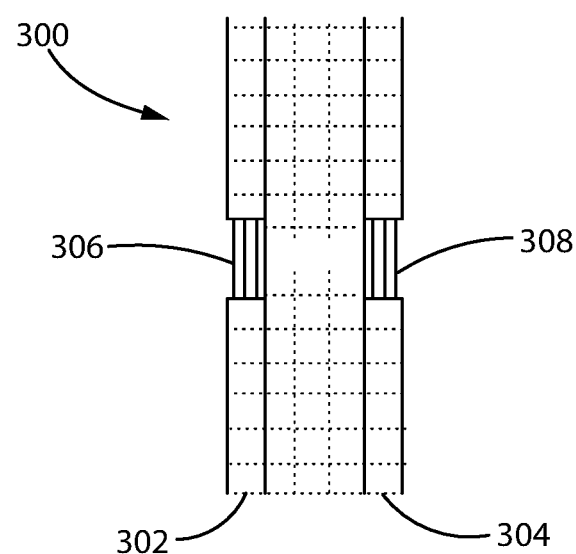
FIG. 3 illustrates a top view of a preform that allows warp sliding.

FIG. 3 illustrates one arm 300 of a C-Beam as woven. The C-Beam is flat woven. Edges 302, 304 of the flat-woven C-Beam will later be formed into flanges of the C-Beam. Warp fibers in edge portions 306, 308 of edges 302, 304 are not interwoven with weft fibers. As such, warp fibers in portions 306, 308 float. The floating of the warp fibers in edges 306, 308 can enable the warp fibers in the arm 300 to slide over warp fibers in another intersecting arm to fold the edges of the arm into the C-Beam cross-sectional shape. The dimension of edge portions 302, 304 in which the warp fibers are floating across the width of the arm 300 can determine the length of the C-Beam flange when folded, which is typically in the range of 0.1 inch to 2 inches, but greater and lesser lengths of flanges are contemplated. The dimension of edge portions 306, 308 along the length of arm 300 may be any width and length, but typically the width will match the width of edge portions 302, 304 and the length will accommodate the width of a crossing arm (not illustrated in FIG. 3). However, the dimensional ranges of edge portions 306, 308 range is not a limiting factor in the disclosed structure.

Figure 4:
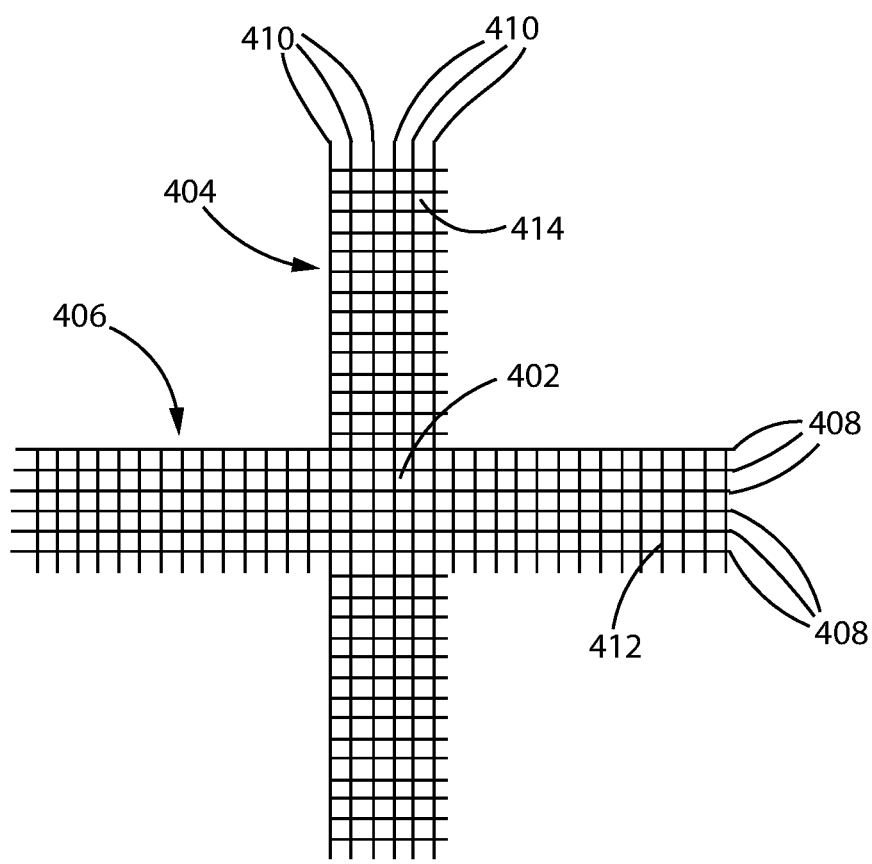
FIG. 4 illustrates a top view of an as-formed flange intersection.

FIG. 4 illustrates a top view of the intersection of flanges after a flanged C-Beam cruciform has been formed. In FIG. 4, the cross hatching on the horizontal arm represents a flange of a first arm 406 of the C-Beam cruciform that is visible from the top and the cross hatching on the vertical arm represents a flange of a second arm 404 of the C-Beam cruciform. Flanges 404, 406 may be formed perpendicular to one another or at any desired angle for the final cruciform structure.

The horizontal lines along the length of first arm 406 represent warp tows 408 of first arm 406. The lines perpendicular to the warp tows 408 represent the weft tows 412 of first arm 406. Similarly, the vertical lines 410 along the length of the second arm 404 represent warp tows 410 of second arm 404. And the lines perpendicular to the warp tows 410 represent the weft tows 414 of second arm 404.

The location where the first arm 406 and second arm 404 cross is the intersection—crossover portion 402—of the cruciform. In FIG. 4 the weft tows 412, 414 are not present in the flanges of the first and second arms in crossover portion 402 of the formed preform.

Figure 5:
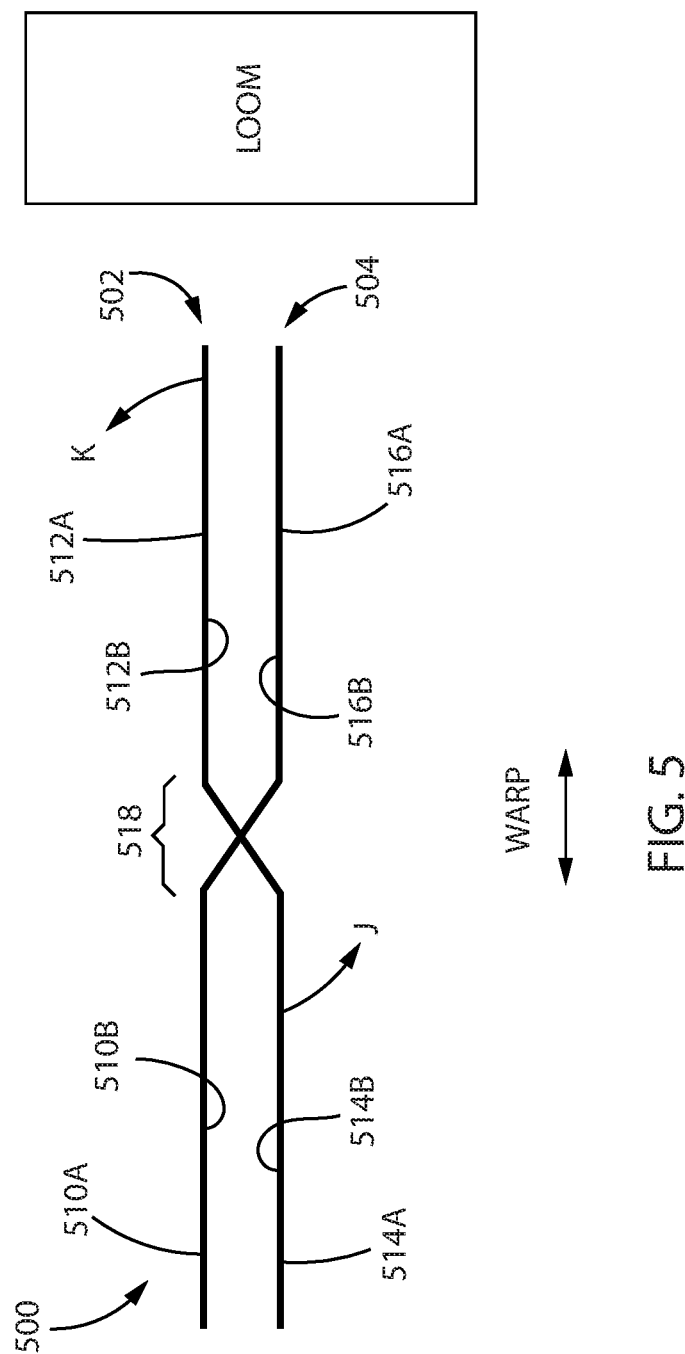
FIG. 5 illustrates a cross-sectional view of an as-woven preform having one crossover portion.

FIG. 5 illustrates a cross-sectional view in the warp direction of as-woven fabric preform 500 as the fabric comes off a loom. The preform illustrated includes two multilayer fabrics 502, 504 that will form a cruciform structure having one crossover portion 518. Multilayer fabric 502 is woven under multilayer fabric 504 before the crossover portion. Multilayer fabric 502 is woven over multilayer fabric 504 after the crossover portion.

For identification in later figures, multilayer fabric 502 has surface 514A on one side of the fabric and 514B on the opposite side of the fabric before the crossover portion. Multilayer fabric 502 has surface 512A on one side of the fabric and 512B on the opposite side of the fabric after the crossover portion. Similarly, multilayer fabric 504 has surface 510A on one side of the fabric and 510B on the opposite side of the fabric before the crossover portion. Multilayer fabric 504 has surface 516A on one side of the fabric and 516B on the opposite side of the fabric after the crossover portion.

The warp fibers of the first and second multilayer fabrics float in the crossover portion where they will be folded into flanges and the warp fibers in the first and second multilayer fabrics are continuous across the crossover portion. The first multilayer fabric can later be used to form a first arm of the C-Beam cruciform. Likewise, the second multilayer fabric can later be used to form a second arm of a C-Beam cruciform. The first and second multilayer fabrics are rotated about the crossover portion so that the fabrics are at a desired angle to one another. In a particular embodiment, the angle between the first and second multilayer fabrics is 90 degrees. However, other angles such as 45 degrees, etc. are contemplated. The edges of the first multilayer fabric are folded to form flanges so the first multilayer fabric has a C-shaped cross-section. Similarly, the edges of the second multilayer fabric are folded to form flanges so the second multilayer fabric has a C-shaped cross-section.

The preform is a two-dimensional (flat-woven) structure having a first multilayer fabric woven over a second multilayer fabric for a desired length of the preform. The first multilayer fabric intersects with the second multilayer fabric at a crossover portion of the preform so that after the crossover portion the first multilayer fabric is woven underneath the second multilayer fabric. That is, the first and second multilayer fabrics are interwoven with one another at the crossover portion and are elsewhere not interwoven with one another in the preform in a cruciform structure having one crossover portion according to the present disclosure.

Figure 6:
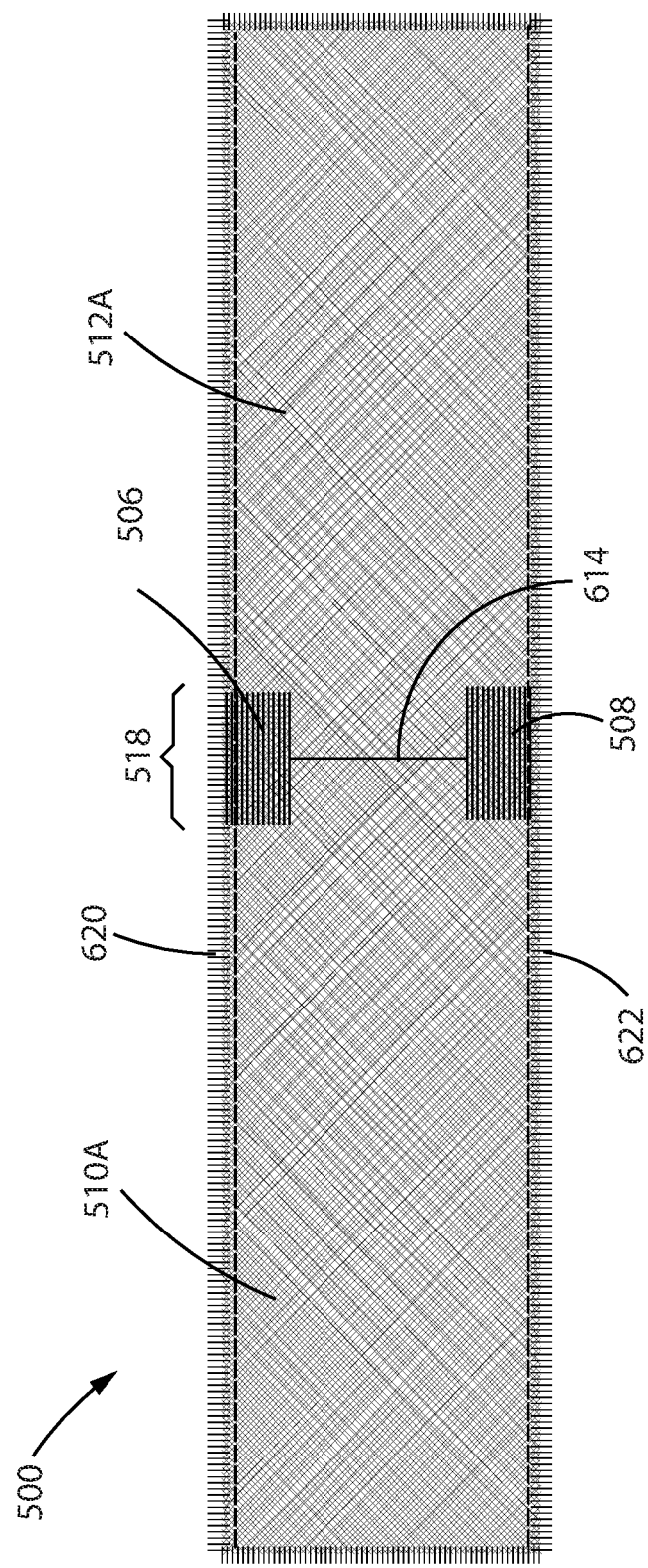
FIG. 6 illustrates a top view of a preform according to the present disclosure as-woven.

FIGS. 6 through 11 show views in the forming of woven preform 500 having one crossover portion using the identification of surfaces in FIG. 5. FIG. 6 is a top view of the flat-woven fabric preform prior to forming into a C-Beam structure with one crossover portion 518. Warp fibers in portions 506, 508 on edges 620, 622 of the fabric are not interwoven with weft fibers. As such, warp fibers in portions 506, 508 float. Surfaces 510A, 512A identified in FIG. 5 are seen in the top view of the woven fabric preform on respective sides of a midpoint 614.

Figure 7:
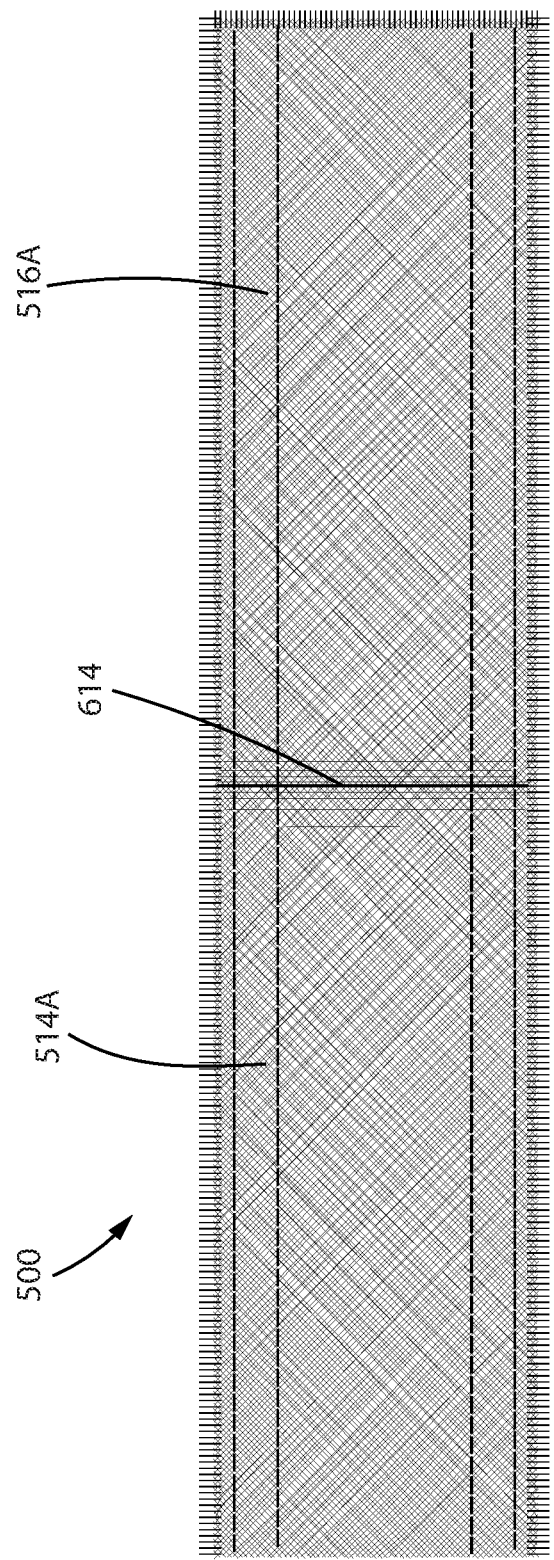
FIG. 7 illustrates a bottom view of the preform of FIG. 6.

FIG. 7 is a bottom view of the fabric preform 500 of FIG. 6 where areas 506, 508 interwoven in the top view are not interwoven in the bottom view. Surfaces 514A, 516A identified in FIG. 5 are seen in the bottom view of the woven fabric preform on respective sides of midpoint 614.

Figure 8:
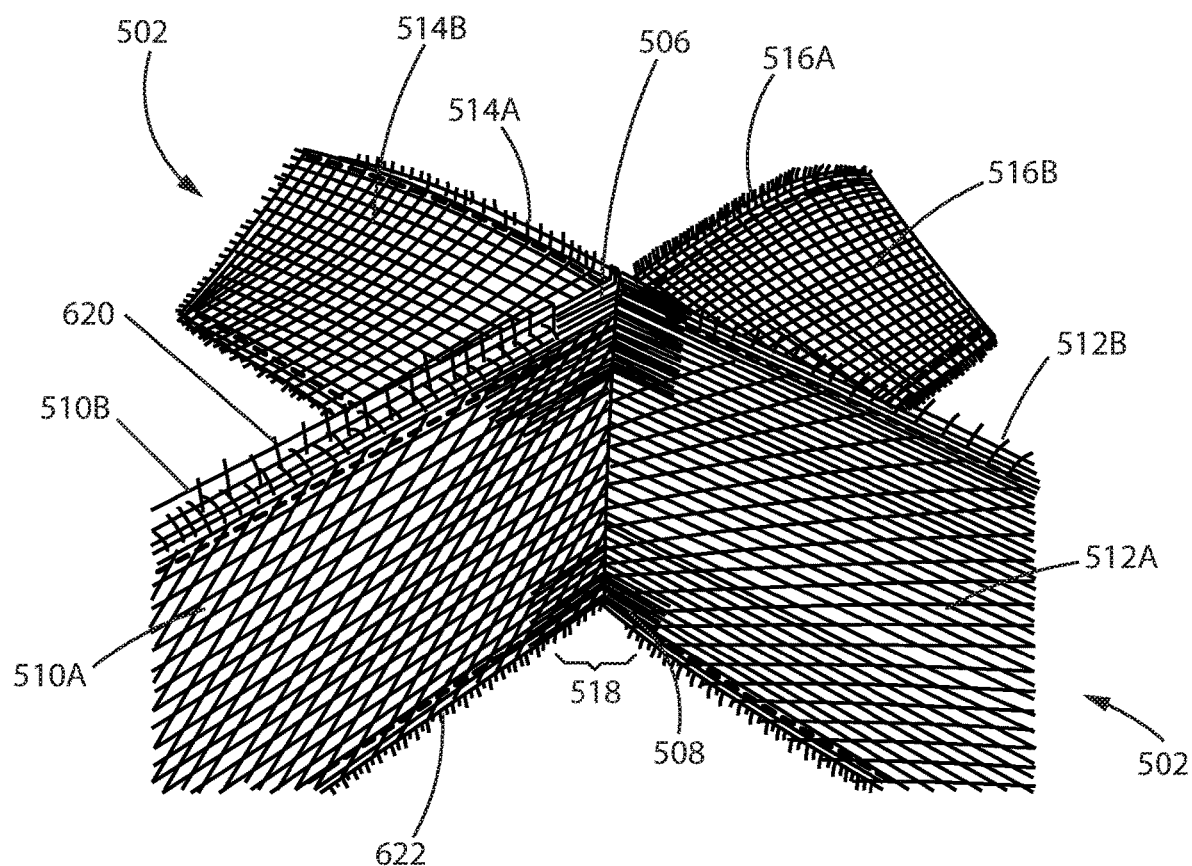
FIG. 8 illustrates the preform of FIG. 7 formed into a cruciform.

FIG. 8 shows forming the flat-woven fabric illustrated in FIG. 5 into a C-Beam cruciform by rotating fabrics 502, 504 with respect to one another. For purposes of explanation, fabric surfaces 512A, 512B and 514A, 514B of multilayer fabric 502 are rotated in the direction of the arrows J and K shown in FIG. 5.

Figure 9:
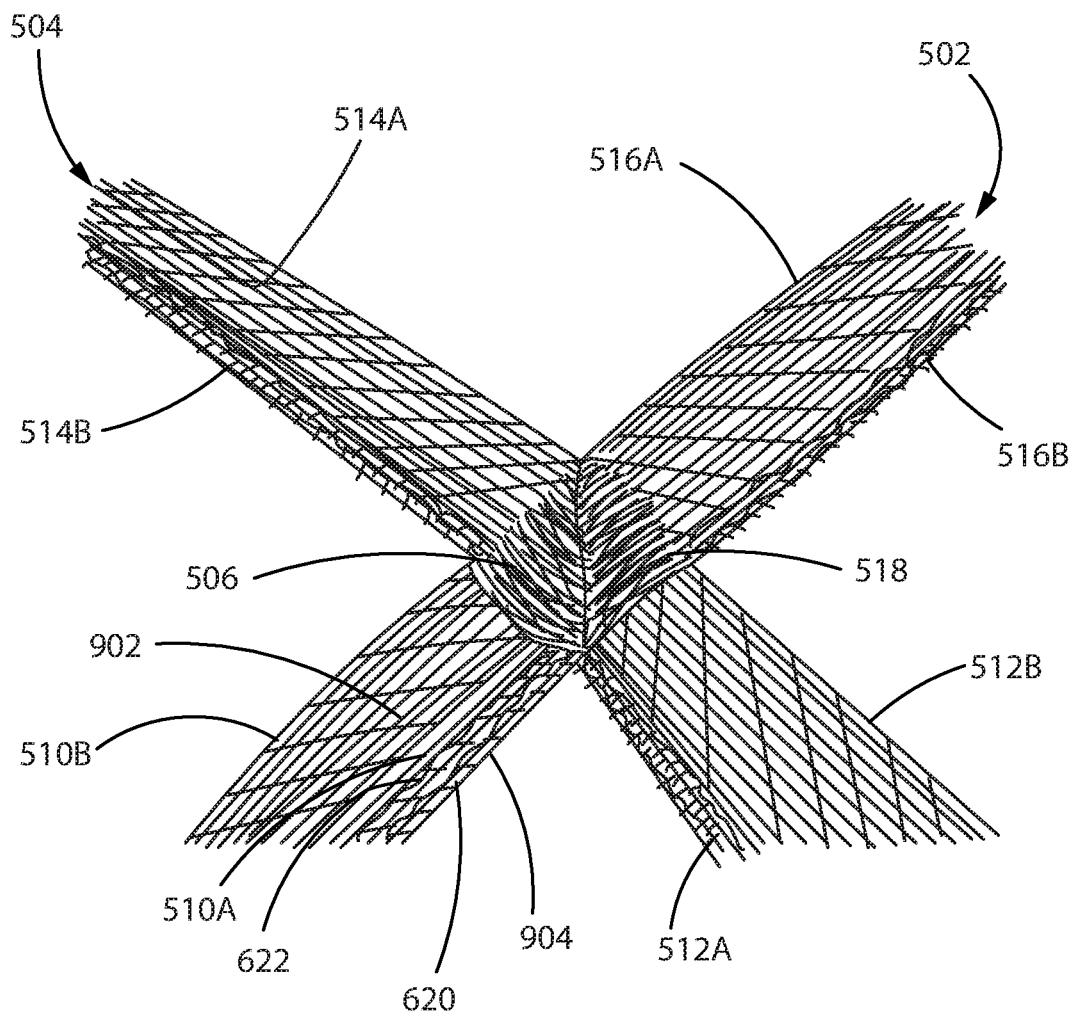
FIG. 9 illustrates a top view of a top edge folded into a flange on the cruciform of FIG. 8.

FIG. 9 is a top view showing the forming of the C-Beam cruciform of FIG. 8 into a C-Beam cruciform. Edges 620, 622 are folded to form flanges 902, 904, respectively, resulting in the C-Beam cross-sectional shape. Warp fibers in crossover portion 518 are floating, which enables edges 620, 622 to be folded. The warp fibers in portion 506, for example, in the crossover portion 518 are not interwoven with weft fibers. As such, the warp fibers in multilayer fabric 502 in the crossover portion can slide over the floating warp fibers of multilayer fabric 504 in the crossover portion without being obstructed by weft fibers. Remaining edges are similarly folded to form C-Beam cross-sectional shapes on the other arms of the cruciform structure.

Figure 10:
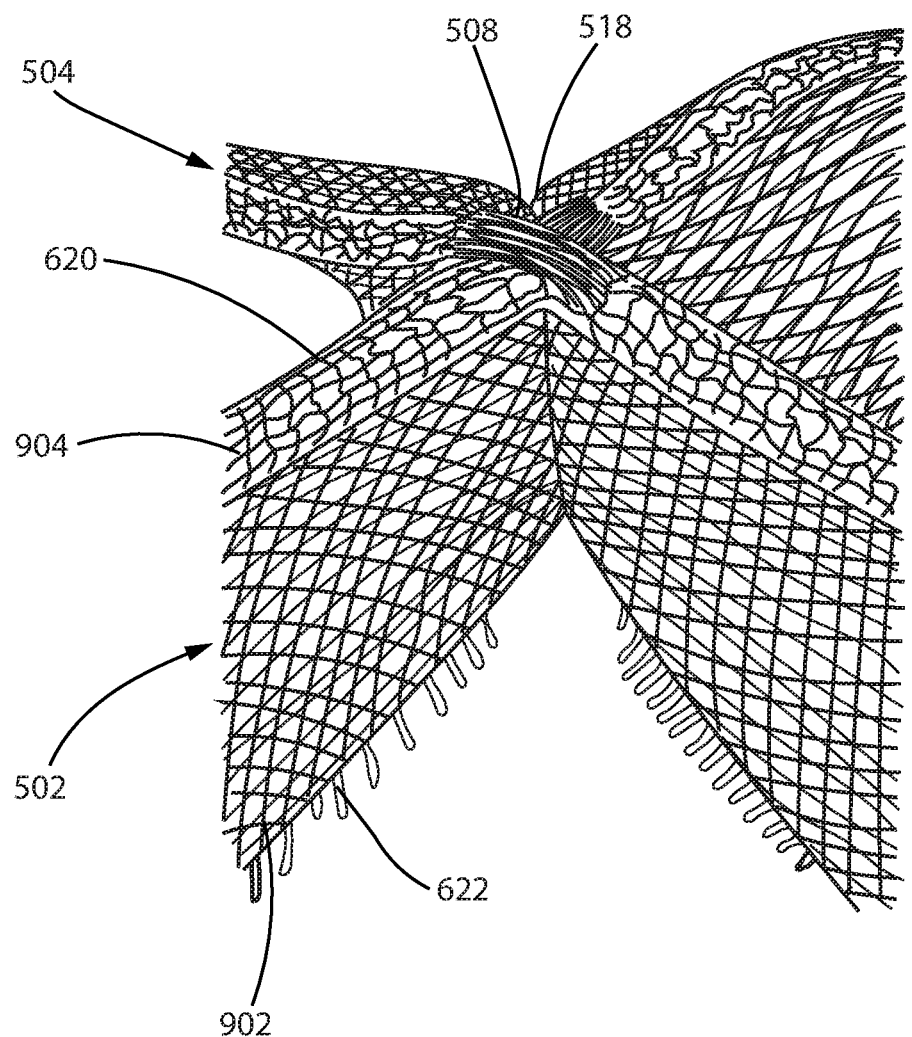
FIG. 10 illustrates a bottom view of a bottom edge folded into a flange on the cruciform of FIG. 8.

FIG. 10 shows a bottom view of the C-Beam cruciform formed in FIG. 9. Similar to FIG. 9 described above, warp fibers in crossover portion 518 are floating, which enables edges 620, 622 to be folded. The warp fibers in portion 508, for example, in the crossover portion 518 are not interwoven with weft fibers. As such, the warp fibers in multilayer fabric 502 in the crossover portion can slide over the floating warp fibers of multilayer fabric 504 in the crossover portion without being obstructed by weft fibers.

Figure 11:
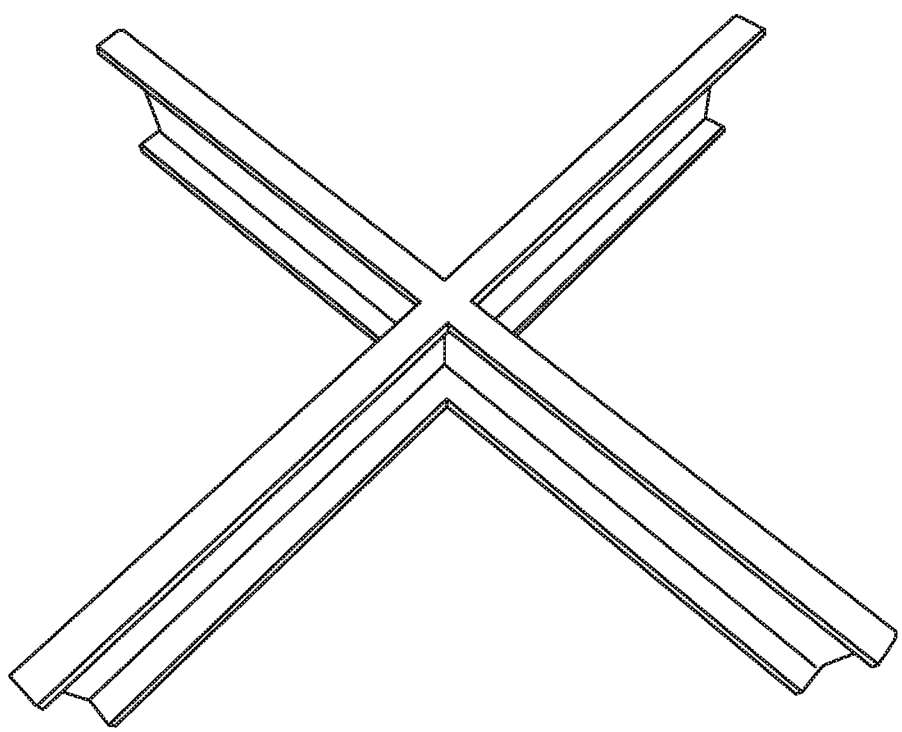
FIG. 11 illustrates a composite of a C-Beam cruciform according to the present disclosure.

After forming the C-Beam cruciform structure, the preform can be impregnated with a matrix material to form a composite. An example of the composite C-Beam cruciform is shown in FIG. 11.

Figure 12:
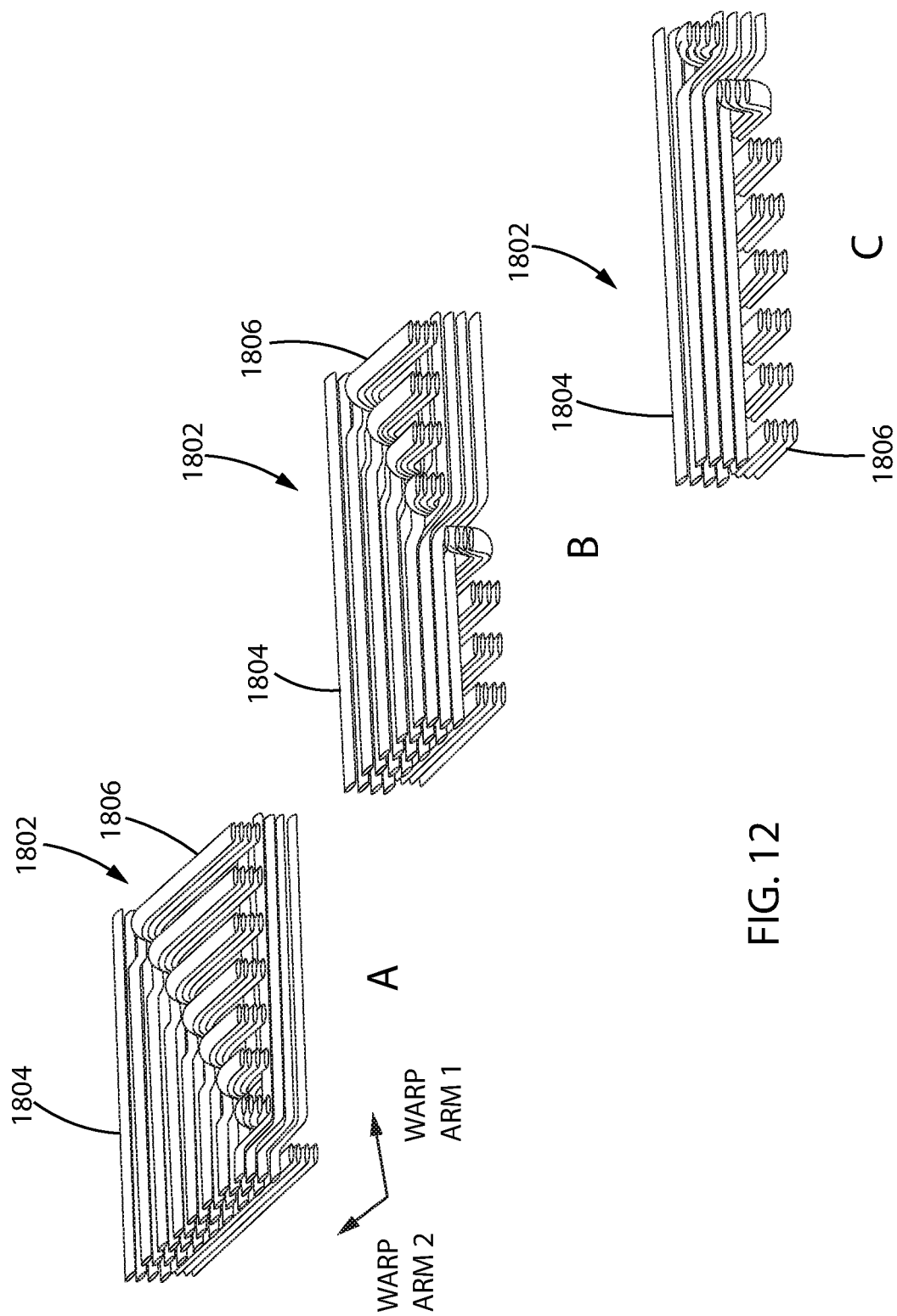
FIG. 12 illustrates a cutaway view of three different warp columns within the intersection.

FIG. 12 illustrates three warp columns A, B, and C in the flange crossover portion of a C-Beam cruciform (after forming). Warp tows 1804 of the flange of the first arm and warp tows 1806 of the flange of the second arm are not interwoven with weft fibers. As shown, warp tows of the first arm 1804 are interwoven with warp tows 1806 of the second arm across the crossover portion 1802. This feature enables the arms of the C-Beams to rotate about the crossover portion when being formed from the as-woven preform into the desired cruciform shape.

Figure 13:
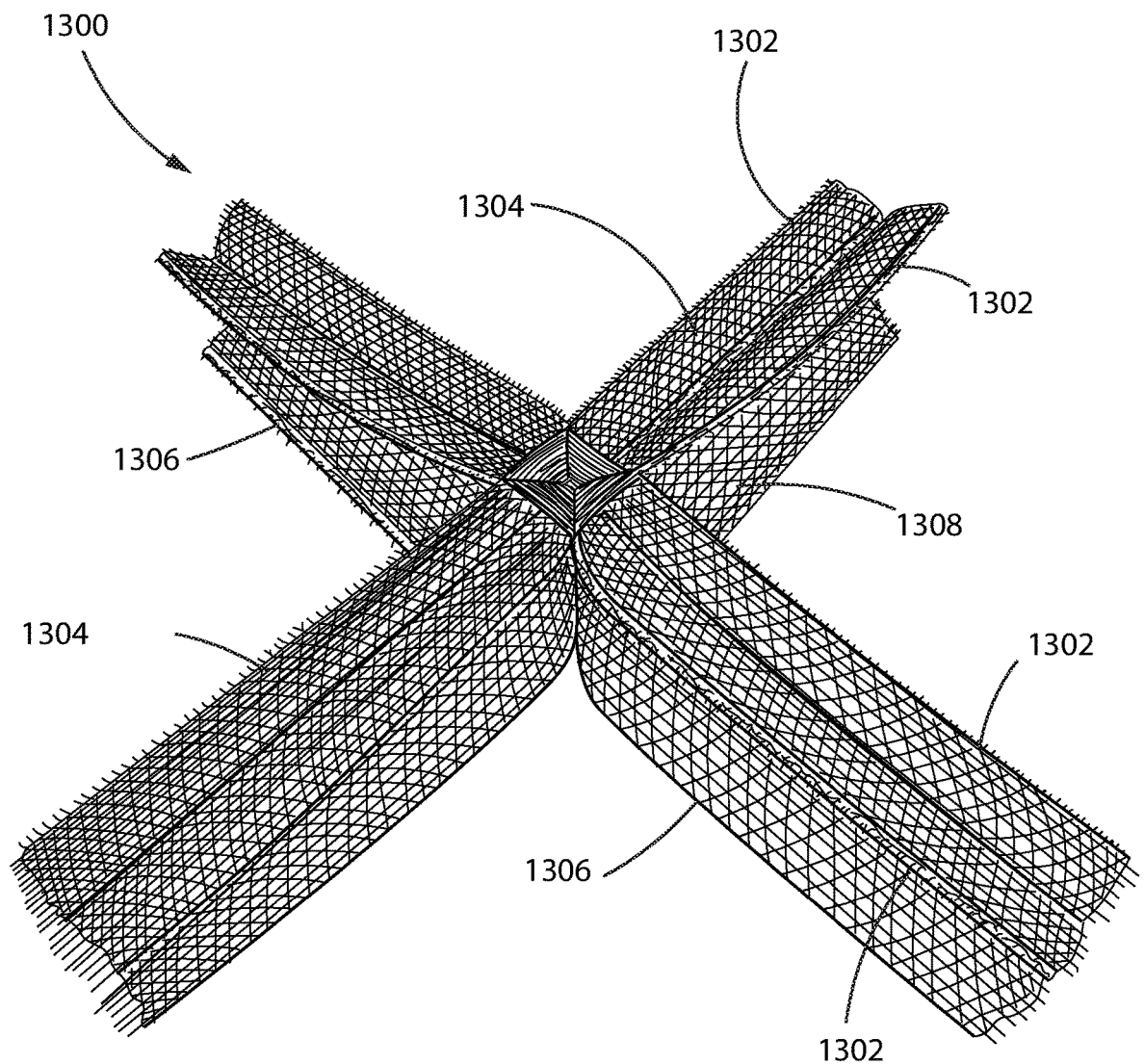
FIG. 13 illustrates an I-Beam cruciform woven and formed according to the present disclosure.

The subject invention can also be applied to make an I-Beam cruciform preform 1300, shown in FIG. 13. The preform comprises a first arm 1306 and a second arm 1304. Each of first arm 1306 and second arm 1304 has two opposing flanges 1302. The first and second arms intersect at crossover portion 1308.

Figure 16:
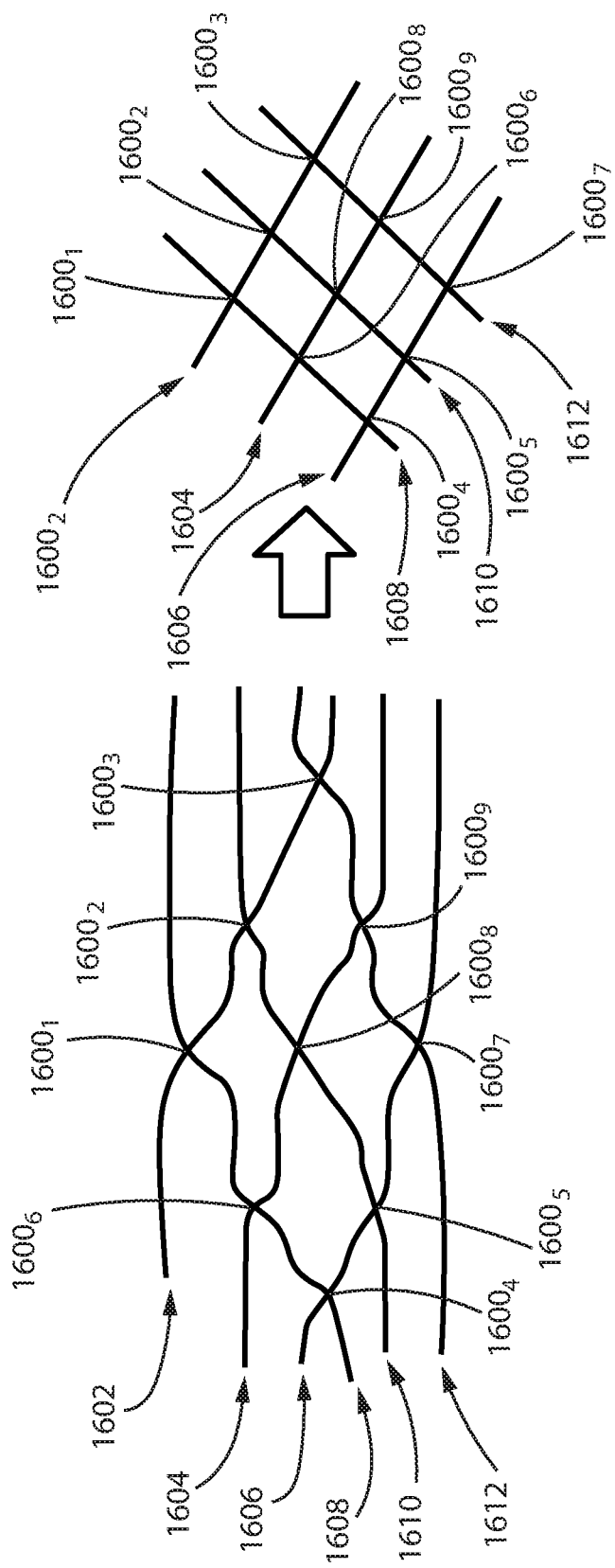
FIG. 16 illustrates a cross-sectional view of an as-woven preform having nine crossover portions.

The present invention is not limited to woven preforms having only one crossover portion that may be formed into C-Beam cruciform structures. Cruciform structures having C-Beam cross-sectional forms that are flat-woven with multiple crossover portions may be formed. FIGS. 14 to 16 illustrate cross-sectional views of multilayer fabrics that may be used to form cruciform structures. Preforms with other cross-sectional forms including, but not limited to, "H-Beam", "I-Beam", "T-Beam", "L-Beam", and "π-Beam" are contemplated as well.

FIG. 14 illustrates a cross-sectional view of a flat-woven preform having two multilayer fabrics 1402, 1404 and a single crossover portion $1400_1$. Multilayer fabric 1402 is woven over multilayer fabric 1404 on one side of crossover portion $1400_1$ and under multilayer fabric 1404 on another side of the crossover portion. As discussed in detail above, the preform can be formed in a C-Beam structure having a "cross" or "X-shape".

FIG. 15 illustrates a cross-sectional view of a flat-woven preform having four multilayer fabrics 1502, 1504, 1506, 1508 and four crossover portions $1500_1$, $1500_2$, $1500_3$, $1500_4$. Each multilayer fabric includes two crossover portions with each of two other multilayer fabrics. In each case, a first multilayer fabric is woven over a second multilayer woven fabric on one side of the crossover portion and under the second fabric on the other side of the crossover portion. For, example, multilayer fabric 1502 includes two crossover portions $1500_1$, $1500_4$ with multilayer fabrics 1506 and 1508, respectively. Fabric 1502 is woven over fabric 1506 on one side of crossover portion $1500_1$ and under fabric 1506 on the other side of crossover portion $1500_1$. Fabric 1502 is woven over fabric 1508 on one side of crossover portion $1500_4$ and under fabric 1508 on the other side of crossover portion $1500_4$. A similar weaving may be accomplished for each of remaining fabrics 1504, 1506, 1508. In this embodiment, the result is a cruciform structure having the form of a "hash" or "number" symbol shape that bounds an open area 1518.

Figure 17:
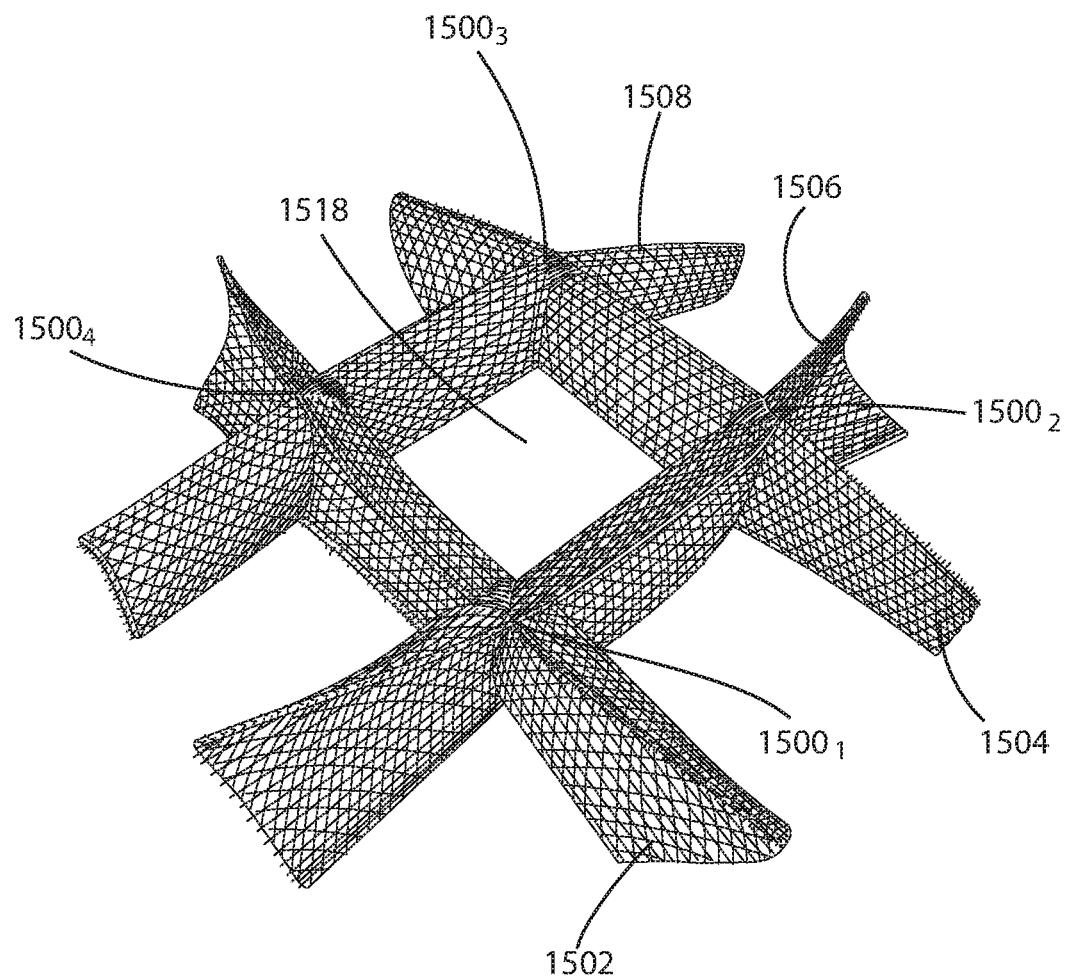
FIG. 17 illustrates a C-Beam cruciform formed from an as-woven preform having four crossover portions.

FIG. 17 is an illustration of the cruciform structure formed from the fabric illustrated in FIG. 15. The cruciform structure shown in FIG. 17 includes four arms 1502, 1504, 1506, 1508. Each arm intersects with two other arms at crossover portions. As such, each arm has two crossover portions. Arm 1502 includes crossover portions $1500_1$, $1500_4$ with multilayer fabrics 1506 and 1508, respectively; arm 1504 includes crossover portions $1500_2$, $1500_3$ with multilayer fabrics 1506 and 1508, respectively; arm 1506 includes crossover portions $1500_1$, $1500_2$ with multilayer fabrics 1502 and 1504, respectively; arm 1508 includes crossover portions $1500_3$, $1500_4$ with multilayer fabrics 1504 and 1502, respectively. As discussed above, the result is a structure having the form of a "hash" or "number" symbol that bounds an open area 1518.

FIG. 16 illustrates a cross-sectional view of a flat-woven preform having six multilayer fabrics 1602, 1604, 1606, 1608, 1610, 1612 with nine crossover portions $1600_1$, $1600_2$, $1600_3$, $1600_4$, $1600_5$, $1600_6$, $1600_7$, $1600_8$, $1600_9$. Each of the fabrics includes three crossover portions with three other fabrics. For example, fabric 1602 includes crossover portions $1600_1$, $1600_2$, $1600_3$ with fabrics 1608, 1610, 1612, respectively. The preform woven in this manner results in the complex cruciform pattern illustrated.

Other implementations are contemplated that expand this structure or create other structures from the basic two-arm cruciform described herein. The pattern described in FIGS. 14-16 may be continued for the desired structure. Such structures include, but are not limited, to triangular, rhomboid, pentagonal, hexagonal, etc. shaped structures.

In any of the embodiments, the woven preform can be impregnated with a matrix material. The matrix material includes epoxy, bismaleimide, polyester, vinyl-ester, ceramic, carbon, and other such materials.

Other embodiments are within the scope of the following claims.

The invention claimed is:

1. A method of forming a woven preform, comprising: weaving a first fabric over a second fabric in a first portion of the woven preform, the first and second fabrics each including warp fibers interwoven with weft fibers; interweaving warp fibers of the first fabric with warp fibers of the second fabric at a crossover portion of the woven preform such that after the crossover portion the first fabric is woven under the second fabric in a second portion of the woven preform; wherein the warp fibers in the first and second fabrics are continuous across the crossover portion, and wherein the warp fibers on edges of the first fabric and the warp fibers on edges of the second fabric are floating warp fibers that float in the crossover portion, such that at least one of the edges including the floating warp fibers is folded along an axis of the floating warp fibers that is parallel with the at least one of the edges.

2. The method of forming a woven preform as claimed in claim 1, wherein the first fabric is a single layer fabric or multilayer fabric; and wherein the second fabric is a single layer fabric or multilayer fabric.

3. The method of forming a woven preform as claimed in claim 1, comprising: rotating the first fabric about the crossover portion to form an angle with respect to the second fabric.

4. The method of forming a woven preform as claimed in claim 3, wherein the angle is 90 degrees.

5. The method of forming a woven preform as claimed in claim 1, comprising: folding edges of the first and second fabrics to cause the preform to have a cross-sectional shape selected from the group consisting of H-Beam, I-Beam, T-Beam, L-Beam, and Pi-Beam.

6. The method of forming a woven preform as claimed in claim 1, comprising: folding the edges of the first fabric into a C-Beam; and folding the edges of the second fabric into a C-Beam.

7. A method of forming a composite support structure comprising: forming the woven preform as claimed in claim 6; and impregnating the woven preform with a matrix material.

8. A woven preform, comprising: a first fabric of warp fibers interwoven with weft fibers; a second fabric of warp fibers interwoven with weft fibers, wherein the warp fibers of the first fabric are interwoven with the warp fibers of the second fabric at a crossover portion such that the warp fibers in the first fabric and the warp fibers in the second fabric are continuous across the crossover portion, wherein the first fabric and the second fabric elsewhere from the crossover portion are not interwoven with one another, and wherein the warp fibers on edges of the first fabric and the warp fibers on edges of the second fabric are floating warp fibers that float in the crossover portion, such that at least one of the edges including the floating warp fibers is folded along an axis of the floating warp fibers that is parallel with the at least one of the edges.

9. The woven preform as claimed in claim 8, wherein the first fabric is a single layer fabric or multilayer fabric; and wherein the second fabric is a single layer fabric or multilayer fabric.

10. The woven preform as claimed in claim 8, comprising: a third fabric of warp fibers interwoven with weft fibers, wherein the warp fibers of the third fabric are interwoven with the warp fibers of the second fabric at a crossover portion such that the warp fibers in the third fabric and the warp fibers in the second fabric are continuous across the crossover portion, wherein the third fabric and the second fabric elsewhere from the crossover portion are not interwoven with one another, wherein the first, second, and third fabrics form an angle with at least one other of the remaining fabrics.

11. The woven preform as claimed in claim 8, wherein the first and second fabrics have a cross-sectional shape selected from the group consisting of H-Beam, I-Beam, T-Beam, L-Beam, and Pi-Beam.

12. The woven preform as claimed in claim 8, wherein the first and second fabrics each are a C-Beam.

13. A composite support structure, comprising: the woven preform as claimed in claim 8; and a matrix material.

14. A method of forming a woven preform, comprising: weaving at least three woven fabrics including warp fibers interwoven with weft fibers, each woven fabric having a first fabric woven over a second fabric in a first portion of the woven preform; interweaving each of the at least three fabrics with at least one remaining woven fabric at a respective crossover portion, such that there are at least two crossover portions in each woven fabric; wherein after each crossover portion of the at least three woven fabrics, an intersecting fabric woven over another fabric is woven under the another woven fabric, wherein the warp fibers in the intersecting fabrics are continuous across each crossover portion, and wherein the warp fibers on edges of the at least three fabrics are floating warp fibers that float in each crossover portion, such that at least one of the edges including the floating warp fibers is folded along an axis of the floating warp fibers that is parallel with the at least one of the edges.

15. The method of forming a woven preform as claimed in claim 14, wherein each of the at least three fabrics is a single layer fabric or multilayer fabric.

16. The method of forming a woven preform as claimed in claim 15, comprising: rotating the at least three fabrics about the crossover portions so that the at least three fabrics form an angle with at least one other of the at least three fabrics.

17. The method of forming a woven preform as claimed in claim 14, wherein there are four fabrics, each fabric intersecting with exactly two other fabrics.

18. The method of forming a woven preform as claimed in claim 17, comprising: folding edges of each of the four fabrics into a C-Beam.

19. The method of forming a woven preform as claimed in claim 14, comprising: folding edges of each of the at least three fabrics to have a cross-sectional shape selected from the group consisting of H-Beam, I-Beam, T-Beam, L-Beam, and Pi-Beam.

20. The method of forming a woven preform as claimed in claim 14, comprising: folding edges of each of the at least three fabrics into a C-Beam.

21. A method of forming a composite support structure comprising: forming the woven preform as claimed in claim 18; and impregnating the woven preform with a matrix material.

22. A method of forming a composite support structure comprising: forming the woven preform as claimed in claim 20; and impregnating the woven preform with a matrix material.

23. A woven preform, comprising: at least three woven fabrics having warp fibers interwoven with weft fibers, each woven fabric having a first fabric woven over a second fabric in a first portion of the woven preform; wherein each of the at least three woven fabrics is interwoven with at least one remaining woven fabric at a respective crossover portion, such that there are at least two crossover portions in each woven fabric; wherein after each crossover portion of the at least three woven fabrics, an intersecting fabric woven over another fabric is woven under the another woven fabric, wherein the warp fibers in the intersecting fabrics are continuous across each crossover portion, and wherein the warp fibers on edges of the at least three fabrics are floating warp fibers that float in each crossover portion, such that at least one of the edges including the floating warp fibers is folded along an axis of the floating warp fibers that is parallel with the at least one of the edges.

24. The woven preform as claimed in claim 23, wherein each of the at least three fabrics is a single layer fabric or multilayer fabric.

25. The woven preform as claimed in claim 23, wherein the at least three fabrics form an angle with at least one other of the at least three fabrics.

26. The woven preform as claimed in claim 23, wherein the at least three fabrics have a cross-sectional shape selected from the group consisting of H-Beam, I-Beam, T-Beam, L-Beam, and Pi-Beam.

27. The woven preform as claimed in claim 23, wherein there are four fabrics, each fabric intersecting with exactly two other fabrics.

28. The woven preform as claimed in claim 27, wherein each of the four fabrics is a C-Beam.

29. The woven preform as claimed in claim 25, wherein each of the at least three fabrics is a C-Beam.

30. A composite support structure comprising: the woven preform as claimed in claim 28; and a matrix material.

31. A composite support structure comprising: the woven preform as claimed in claim 29; and a matrix material.

* * * * *